Patented Jan. 8, 1924.

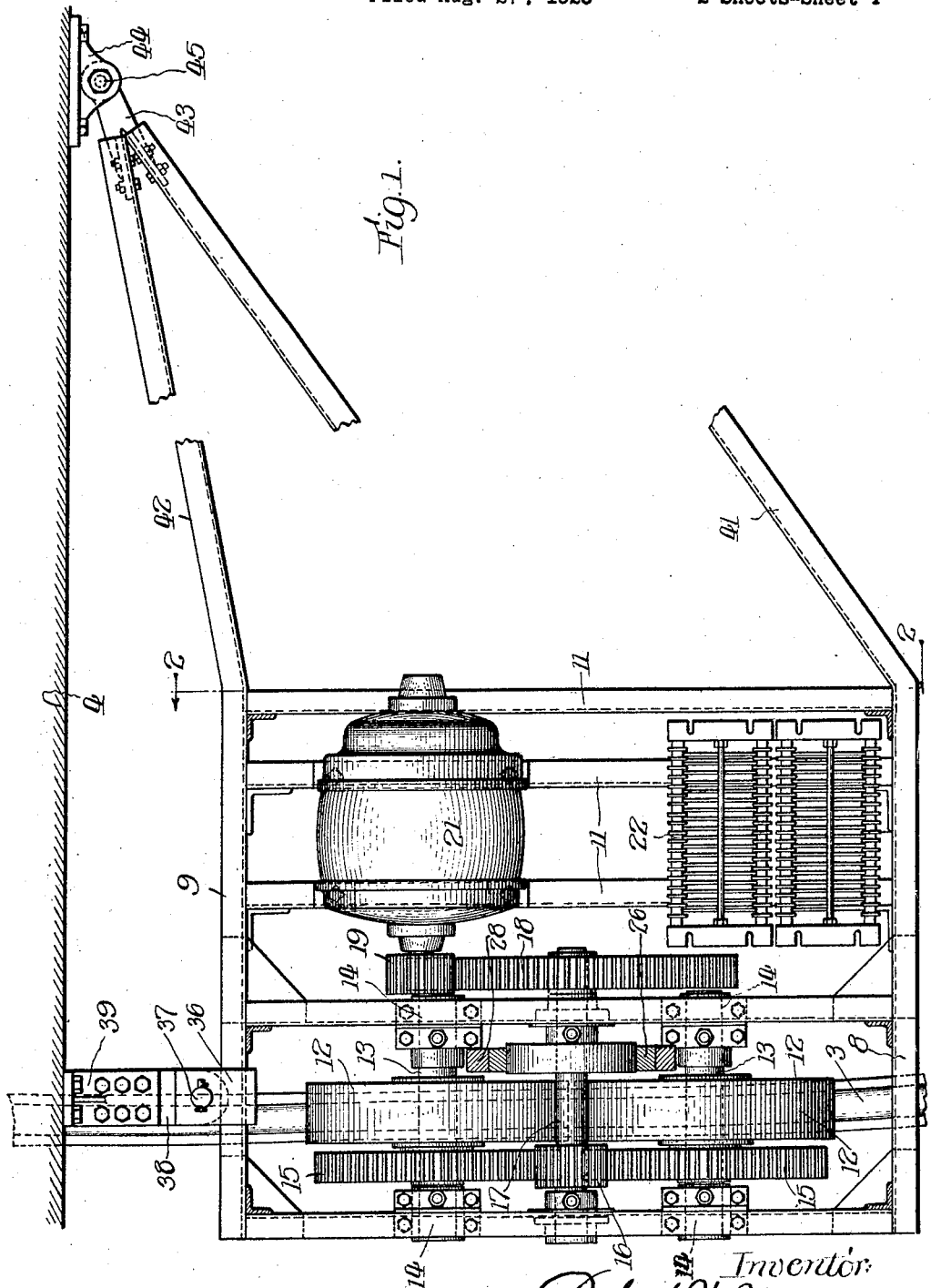

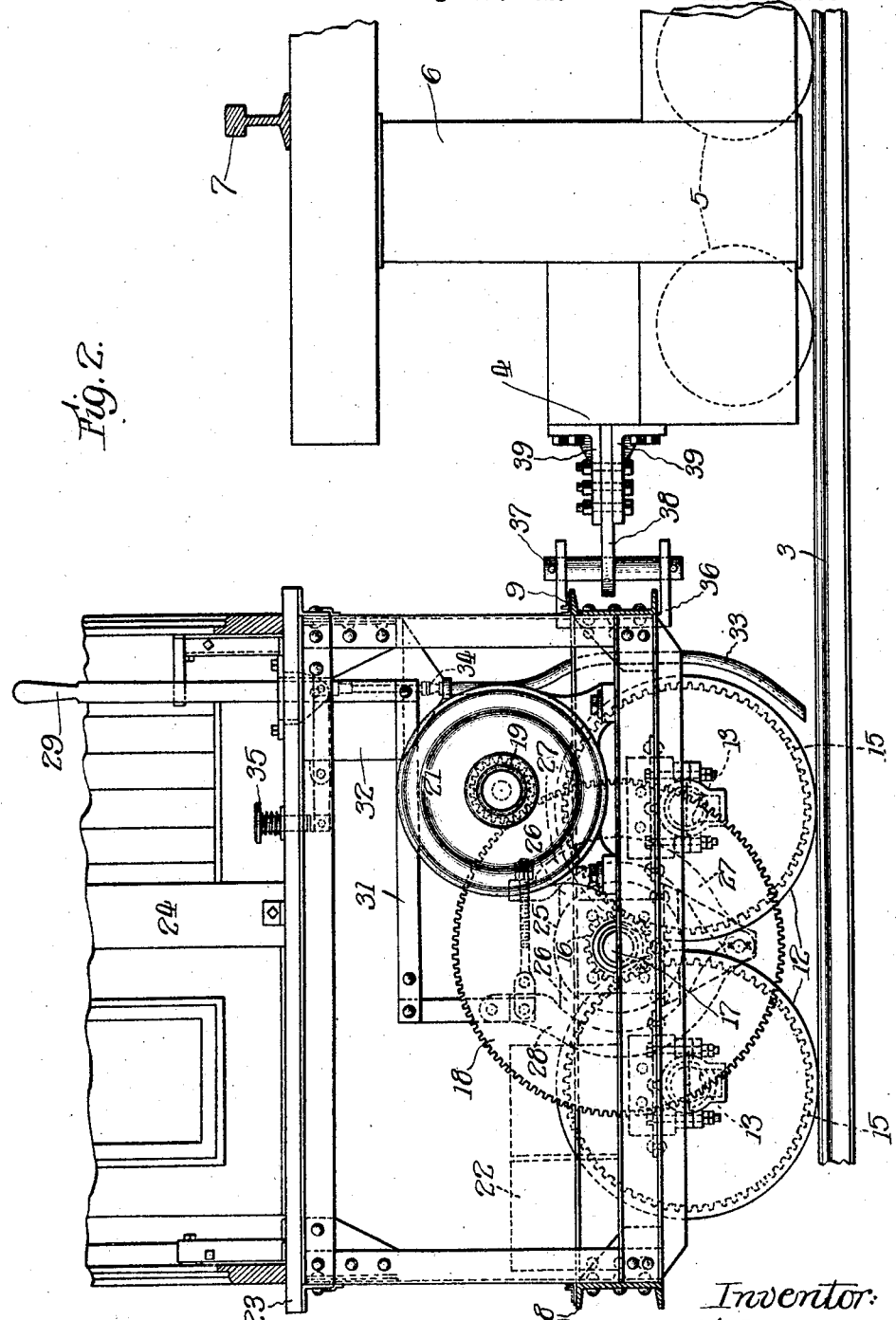

1,480,038

UNITED STATES PATENT OFFICE.

ROBERT W. YOUNG, OF WILMETTE, ILLINOIS.

TURNTABLE TRACTOR.

Application filed August 27, 1923. Serial No. 659,459.

*To all whom it may concern:*

Be it known that I, ROBERT W. YOUNG, a citizen of the United States, residing in the village of Wilmette, in the county of Cook and State of Illinois, have invented certain new and useful Improvements in Turntable Tractors, of which the following is a specification.

This invention pertains in general to traction apparatus, and has more particular reference to a tractor adapted to travel upon the circle rail of a turntable and to propel a turntable of the heavy, locomotive carrying type.

I am aware that turntables have been provided with driving mechanism mounted directly thereon, but, as the result of the shocks to which such turntables are subjected when a locomotive is run onto or off from the table, driving mechanism carried by the table is difficult to keep in working order. Furthermore, since the weight is usually unevenly distributed on the turntable, one end or the other has a tendency to be elevated, thereby reducing the friction, and consequently the traction of the propelling wheels at such end. Turntable tractors, structurally independent of the turntable structure itself, have also been employed, but such tractors have customarily embodied but one driving wheel and have been more or less rigidly connected to the turntable, with the result that up and down movements of the turntable were transmitted to the tractor, causing it to tilt about its single driving wheel with such violence that injury to the mechanism, particularly the electrical apparatus, frequently occurred.

One of the primary purposes of my present invention is to provide a tractor which will be structurally independent of the turntable and loosely connected thereto so as not to receive or to be affected by the vertical movements of the turntable, and which will embody two supporting and traction wheels, thus making the tractor substantially self-balancing, and in addition increasing its tractive effort over the single wheel tractors, to which reference has been made.

Another object of the invention is to provide a tractor which will be strong, substantial, and durable in construction, one which can be readily attached to any desired turntable, and which will be efficient in operation and easy to control.

Other objects and advantages of the invention should be readily apparent as the same becomes better understood by reference to the following description, when considered in connection with the accompanying drawings.

Referring to the drawings:

Fig. 1 is a plan view, with the cab removed, of a tractor embodying my invention; and Fig. 2 is a sectional view on the line 2—2 of Fig. 1.

Referring to the drawings more in detail, reference character 3 indicates the circle rail of a turntable upon which the turntable proper is adapted to travel. Such turntable, which may be of any preferred construction, is illustrated, somewhat diagrammatically, reference character 4 indicating one of the radial members of the structure, reference character 5 the carrying wheels, 6 a supporting member, and 7 one of the rails upon which the locomotive or car to be turned is supported.

The tractor comprises a main frame consisting of front and rear frame members 8 and 9 connected by a series of cross-members 11, all rigidly secured together by suitable angles, gusset plates, and braces, if desired. A pair of traction and supporting wheels 12 fixed upon axles 13, journaled in suitable bearings 14 carried by the frame structure, are arranged in tandem to travel upon the circle rail 3. These wheels carry the weight of the tractor and substantially balance the same, and also afford a two-point contact with the circle rail through which the tractive effort is applied when the wheels are driven.

The mechanism for driving the wheels comprises a pair of gears 15 fixed upon their respective shafts 13, and driven by a common driving pinion 16 mounted on a shaft 17, which is provided at its opposite end with a gear 18 meshing with and driven by a pinion 19, carried by the driving shaft of a motor 21. For illustrative purposes I have shown an electric motor of standard construction, although any other type of motor, such as internal combustion motor, a compressed air motor, or other preferred type, may be employed, and in some instances it may be desirable to equip the tractor with two types of motors in order that either may be used should the source of power for the other fail. In the form illustrated the motor controller 22 is shown as mounted on the frame structure in proximity to the motor and beneath the floor 23 of the operator's cab 24, which is disposed directly over the driving mechanism.

Upon the shaft 17 there is mounted a brake drum 25 adapted to be engaged by the wooden brake blocks 26 carried respectively by the brake members 27 and 28, and adapted to be actuated by the operator through a brake lever 29 connected by a link 31 with the brake members. A sand box 32 is preferably mounted on the frame beneath the floor of the cab and is equipped with a discharge pipe 33 controlled by a valve 34, which is actuated by the operator through a foot pedal 35.

The member 9 of the main frame is equipped with a rearwardly projecting bifurcated coupling bracket 36 adapted to receive a coupling pin 37 which passes through a link 38, in turn rigidly secured by bracket members 39 to the frame structure of the turntable proper. It will be observed from Fig. 2 that the space between the bifurcations of the coupling bracket 36 permits a considerable range of vertical movement of the link 38 without transmitting such movement to the tractor, and the parts are so designed that the maximum vertical movements of the turntable will be accommodated without imparting any of such movements to the tractor.

The tractor is also connected to the turntable structure at a point near the center of rotation of the turntable through a laterally extending bracket or frame extension, substantially triangular in shape, and preferably formed by extending the main frame members 8 and 9 inwardly to provide the extension members 41 and 42. These members are connected at their juncture at the apex of the triangle by a member 43 adapted to loosely fit between the ears of a bracket 44, bolted to the turntable structure, this member being pivotally connected to the bracket by a bolt 45, as will be apparent from Fig. 1. This frame extension, therefore, holds the tractor in proper radial position with the traction wheels disposed upon the circle rail, and also holds the tractor in upright position against lateral tilting movements.

My improved tractor is therefore a structurally independent unit which may be readily attached to any turntable. It is self-balancing by reason of the two traction and supporting wheels so that it has no tendency to tilt forwardly or backwardly, and it is capable of exerting a maximum tractive effort by reason of the application of power to both wheels. The loose, flexible connection between the tractor and the outer end of the turntable permits the turntable to move vertically under the influence of the weight imposed thereon, without imparting any of such movements to the tractor, with the result that the mechanism and electrical equipment of the tractor are not injured or disturbed by the movements of the turntable, nor is the operator subjected to the inconvenience of a violently tilting cab, as he is in a single wheel tractor.

A tractor embodying my invention is serviceable, durable, and efficient; is capable of being economically manufactured, assembled, and shipped as an independent unit; and can be quickly and easily attached to any type or size of turntable.

While I have shown and described a preferred embodiment of the invention, obviously the details of construction are capable of considerable modification without departing from the spirit of the invention, as defined in the following claims.

I claim:

1. In a turntable tractor the combination of a main frame, a pair of supporting and driving wheels mounted in tandem relation on said frame, means of applying power to both of said wheels, means for flexibly connecting said frame to a turntable so that vertical movements of the turntable will not be imparted to the tractor, a triangular frame structure rigid with said main frame and extending laterally therefrom, and means at the apex of said frame structure for connecting the same to the turntable.

2. In a turntable tractor the combination of a main frame, a pair of supporting and driving wheels mounted in tandem relation on said frame and adapted to travel on the circle rail of a turntable, means for applying power to both of said wheels, means for so connecting said frame to a turntable as to prevent vertical movements of the turntable from being imparted to the tractor, a triangular frame structure including rigid extensions of the main frame members projecting laterally from said main frame, and means for pivotally connecting said frame structure to the turntable at a point remote from the main frame.

3. The combination with a turntable of a tractor comprising a main frame, a pair of traction wheels mounted therein in tandem relation and means for driving both of said wheels, a vertically slidable connection between the turntable and the tractor frame, and a pivotal connection between the turntable and said frame remote from said wheels.

4. In a turntable tractor the combination of a frame, a pair of driving wheels mounted in tandem in said frame and adapted to travel upon the circle rail of a turntable, a gear connected to each wheel, a driving pinion meshing with said gears, a shaft upon which said pinion is mounted, a brake drum on said shaft, a brake adapted to cooperate with said drum, means for driving said shaft, a cab mounted on said frame, a lever in said cab connected with said brake for operating the same, means for flexibly connecting said frame with a turntable in proximity to the plane of said wheels, an extension frame projecting laterally from said main frame, and means for pivotally connecting the extreme end of said extension frame with the turntable.

5. In a turntable tractor the combination of a main frame comprising front and rear members connected by a plurality of cross-members, said front and rear members being extended at one side of said frame and bent rearwardly, the ends of said extensions being connected together, means for connecting said ends to a turntable remote from the circle track, a pair of driving wheels mounted in said frame, means for driving said wheels, and a flexible connection between said frame and the turntable in proximity to the circle track, said connection comprising a vertically disposed coupling pin and a link adapted to slide vertically on said pin.

ROBERT W. YOUNG.